United States Patent [19]
Berner

[11] 3,853,972
[45] Dec. 10, 1974

[54] PROCESS FOR RAPIDLY MOLDING ARTICLES FROM FOAMABLE THERMOPLASTIC PARTICLES INVOLVING MULTIPLE FOAMING OPERATIONS

[76] Inventor: Erling Berner, 2890 Cavey Crest Circle, Allison Park, Pa. 15101

[22] Filed: July 11, 1972

[21] Appl. No.: 270,669

[52] U.S. Cl............... 264/53, 260/2.5 B, 264/101, 264/237, 264/DIG. 5, 264/DIG. 9, 264/DIG. 69
[51] Int. Cl............................................ B29d 27/00
[58] Field of Search .......... 264/51, 53, DIG. 5, 101, 264/237, DIG. 9, DIG. 69; 260/2.5 B

[56] References Cited
UNITED STATES PATENTS

| | | | |
|---|---|---|---|
| 3,072,581 | 1/1963 | Platzer | 260/2.5 B |
| 3,085,073 | 4/1963 | Lintner et al. | 260/2.5 B |
| 3,383,441 | 5/1968 | Norrhede et al. | 264/51 |
| 3,427,372 | 2/1969 | Berner | 264/51 |
| 3,503,908 | 3/1970 | Ingram et al. | 260/2.5 B |
| 3,520,833 | 7/1970 | Wright | 260/2.5 B |
| 3,575,892 | 4/1971 | Erchak et al. | 260/2.5 B |
| 3,577,360 | 5/1971 | Immel | 264/DIG. 9 |
| 3,697,454 | 10/1972 | Trimble | 260/2.5 B |

FOREIGN PATENTS OR APPLICATIONS

| | | | |
|---|---|---|---|
| 210,893 | 10/1957 | Australia | 260/2.5 B |
| 807,237 | 1/1959 | Great Britain | 260/2.5 B |
| 850,634 | 10/1960 | Great Britain | 264/53 |
| 978,631 | 12/1964 | Great Britain | 260/2.5 B |

*Primary Examiner*—Philip E. Anderson

[57] ABSTRACT

Pre-foamed thermoplastic beads such as polystyrene are treated to have at least a residual quantity of expanding agent in the pre-expanded periferal portions of the bead to impart additional and rapid foaming properties to the outer pre-foamed periferal portions of the bead, whereby they are further expanded with heat to rapidly fill the interstices between beads as they are molded, allowing high speed continuous molding of the multiple expanded beads.

16 Claims, 7 Drawing Figures

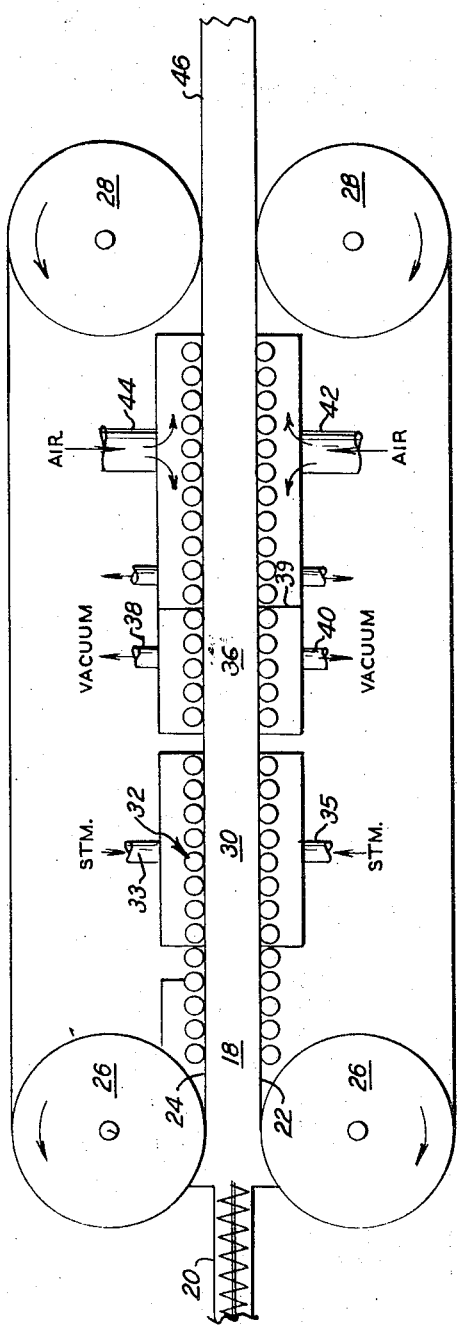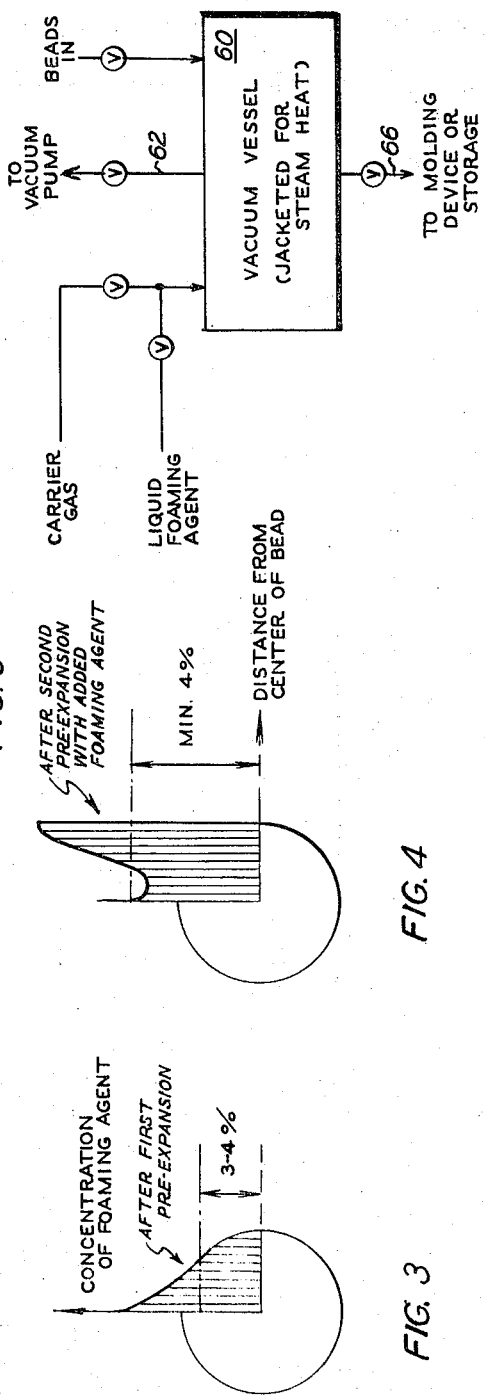

PROCESS FOR RAPIDLY MOLDING ARTICLES FROM FOAMABLE THERMOPLASTIC PARTICLES INVOLVING MULTIPLE FOAMING OPERATIONS

This invention relates to rapidly molding highly surface-expandable thermoplastic beads; to multiple expansion of heat expandable beads containing a surface concentrated foaming agent; and, particularly, to high speed molding of multiple expandable beads into foamed products.

The thermoplastic beads hereof, such as polystyrene beads, have a higher concentration of expanding agent in their surfaces and particularly after initial expansion, are preferably treated with additional expanding agent to increase the surface concentration of the expanding agent and then are further heated to effect a multiple expansion. Such beads having a high surface content of foaming agent become rapidly further expanded with heat and, simultaneously, the heat-softened surfaces cohere into a foamed molded product in a high speed molding of the multiple foamed beads.

Heat expandable beads such as foamable polystyrene beads of various sizes are usually impregnated with foaming agent such as volatile hydrocarbons of the character of butanes, pentanes and mixed petroleum ethers and will vary somewhat with the size and particular expanding agent used in the degree and amount of expansion as well as in their expansion times when heated and, consequently, their molding rates will vary with the specific expanding agent and size used, and finally also with the thermal softening characteristics of the specific polymer of which the bead is formed.

Foamable beads, such as polystyrene beads of commerce, for instance, are usually impregnated with from 4 to 7% and usually about 6% of such variably volatilizable hydrocarbons as forming agent. In the conventional foaming and molding of such beads, the heat applies is generally intended to penetrate to the core of the bead to produce full expansion throughout the beads. The foaming is initiated in the bead surface and the foamed shell formed upon the bead is self insulating. Consequently, the heat penetration is progessively slowed with the expansion. Nevertheless, such bead expanded during molding and even a pre-expanded bead before molding will have a residual volatiles content of about 3% to 4; % about 2% to 3% of the expanding agent having been expelled from the bead in the initial expansion and molding. The remaining volatile component, about 3% to 4, % remains in largest portion in the bead core as the bead has been expanded outwardly from the periferal portions in the pre-expansion and thereafter has been stored in contact with air for a shorter or longer time. Consequently, in order to mold a foamable bead, especially when it was pre-foamed, the heat penetration upon the bead through the outer periferal foamed shell is necessarily slow because of its insulating effect by having been foamed in the expansion and expulsion of its outer volatile content; and any further volatilization of residual volatiles in such pre-foamed bead by heat penetration is necessarily slow because it must penetrate to the core for full expansion.

In broadest aspect of this invention, I have found that if the bead is impregnated with enough volatilizable foaming agent to initially provide enough excess foaming agent to leave a foamable quantity of foaming agent residual in the outer perifery of the bead of at least 1%, more than normally is the case, despite pre-foaming before molding, such bead may be heated and molded quite rapidly. This is because there remains enough residual foaming agent in the periferal or outer shell portions of the bead still to allow rapid heat transfer and provide additional heat expansion and further softening of the outer shell portion of the bead to allow rapid molding. Such further expansion even of the pre-foamed bead allows further expansion of the foamed bead surface portions to rapidly fill interstices between expanded beads in the mold during the molding by heat expansion.

Molding may be greatly accelerated by maintaing a large quantity of volatilizable expanding agent in the pre-foamed beads, averaging at least 4% of foaming agent by weight of the bead, and preferably more, such as 5% to 8% by weight, whereby at least one fifth thereof or 1% of a foamable quantity by weight, and usually more, remains in the outer periferal shell portion of the bead in a position to effect further expansion thereof with heat. A pre-expanded bead containing that extra portion of expanding agent in the outer periferal shell portion thereof does not need to be heated more than sufficient to expand and soften the outer periferal portion; that is, it does not need softening heat penetration to the central core portion or even deeper than about ½ to 1/5 of the bead radius to effect efficient foaming and rapid molding thereof. It suffices that the outer portion has expanded and softened enough to cohere as well as fill the voids between the beads as they enter and pack tangentially in the mold.

That kind of rapid heating of the surface expandable beads allows great speed-up in the continuous molding of the foamed beads. For example, where in an ordinary continuous molding machine a speed for molding a foamed board may be 10 to 15 or 20 board feet per minute, this type of molding may be speeded up to the very extreme mechanical ability of the machine to move as a molding device. For instance, in relatively slow moving horizontal molding channel machines the molding may be increased to range from 50 to 150 feet per minute to form a foamed board. For more rapidly movable molding channels such as a molding channel on the periferal surface of a rotating drum molding device, the molding of board may be effected to reach rates up to 600 feet per minute. That kind of rapid molding in comparison to the present-day continuous molding involves great economies in foamed board production as well as other analogous products that may be continuosly molded from foamed beads. The pre-expansion of beads with following storage inherently denudes the beads of much of its periferal content of foaming agent, but this can be maintained above the 4% minimum, as stated above, by having an excessively large quantity of foaming agent necessarily present in the bead, such as at least 7 ½% of initially contained volatilizable hydrocarbon or other gas-forming agent based on the weight of the bead.

According to a second aspect of this invention, the bead after pre-foaming is again treated with a liquid foaming agent, typically a low boiling organic liquid such as butanes, pentanes, petroleum ethers, Freons, or the like, to cause the pre-foamed bead to reabsorb a superficially large surface quantity of foaming agent in the surface of the bead, such as by spraying of the bead with foaming agent; whereby, upon cooling, the hot pre-foamed bead by the contraction of gases in its foamed body tends to quickly reabsorb foaming agent from the outside inward, a higher concentration of foaming agent remaining in the periferal shell as the hotter and more quickly cooled foamed portion of the bead. The cooling by quenching of the bead in more liquid foaming agent, such as by spraying the bead therewith, imparts a large and concentrated influx of more cold foaming agent into the expanded surface portions of the bead, thereby reducing pressure conditions upon the bead, such cooling enhancing the rapid intake of more foaming agent. Desirably, the initial foaming of the bead can be a more or less rapid heating so that the expansion of the surfae portions is large and rapid. Preferably the foamed bead by heating to expand is treated with a foaming agent and cooled. Such multifoamed bead, upon subsequent molding and heating to expand and soften, expands most rapidly from the periferal portions outward, with the expansion largely taking place from the periferal portions both to soften and also to fill the interstices between the beads with the expanding foam as the beads are tangentially filled within a mold, thus very rapidly increasing the molding speed by the lowered need for extreme heat transfer.

In a third and preferred aspect of this invention, the beads containing a normal quantity such as 6% of foaming agent may be pre-foamed in a vacuum chamber which reduces the substantial pressure in the atmosphere over the beads whereby when they are soft enough to expand, the expansion takes place in a vacuum, allowing the foaming agent to expand to a greater volume. At the expansion temperature the expanded beads do not cohere, but remain loose as expanded beads, and are like free-flowing particles of popcorn. The vacuum expanded beads are then cooled by readmitting a cooling atmosphere where is a gaseous or preferably liquid foaming agent. Such foaming agent may be a liquid, and is applied as a spray or suspension of liquid particles of foaming agent, wetting the surfaces of the beads. The beads are allowed to cool and reabsorb foaming agent progressively from their outer periferal surfaces inward as they cool. In this manner the beads absorb more liquid foaming agent which during the short time until being used in molding mainly remain concentrated in their outer periferal surfaces. Such bead, for purposes of being used as an insulating material or various expanded foam-like substances, i.e., as a filler for insulating materials, may be again reexpanded, preferably in a vacuum and with heat, whereby they will further expand mostly or predominantly as they are heat softened in a vacuum from their outer periferal surfaces whereby they become further expanded, remaining as popcorn with the inadequate heat supply thereby. They may be again cooled in a spray of liquid expanding agent and again vacuum expanded with further or multiple expansions of the bead to a very highly foamed product, greatly exceeding that of known expanded bead products. However, after one or more such expansions and with the bead sprayed to obtain a concentration of expanding agent in its periferal surface, the beads are usually molded rapidly with heat as described above.

The invention is further explained with reference to the drawings wherein:

FIG. 3 illustrates graphically the distribution of a volatilizable foaming agent of a pre-foamed bead;

FIG. 4 illustrates graphically the distribution of the volatilizable foaming agent in which the bead has added additional foaming agent;

FIG. 5 illustrates a vacuum treatment chamber for adding expanding agent to the vacuum-expanded beads;

FIG. 6 shows a longitudinal molding channel intended for high speed molding of a pre-expanded bead having a high concentration of expanding agent in the outer shell portion therein, capable of moldable expansion.

The principle of the invention is illustrated by reference to FIGS. 1 through 4 which graphically illustrate certain aspects of the distribution of the volatile foaming agent within the body of a foamable bead.

While the term 'bead' usually refers to suspension polymerized particles of thermoplastic substances, usually polystyrene, the principles of this invention are more broadly applicable to other foamable polymer particles from which continuous board are similarly molded.

Moreover, beads so formed may vary in size from about 50 up to about 10 mesh U.S. standard screen before expansion. Pre-expanded beads, correspondingly, may vary in diameter but are much larger and because of the heat transfer problem to fuse the beads into a composite board, the sizes of beads are often further classified in sizes of narrower ranges, depending upon the size of molding board to be formed. For instance, for molding boards that are thick such as thick billets, panels or blocks, the raw unexpanded bead diameter will usually be in a range of (a) 0.047 to 0.33 inches; (b) medium thick molded products for packaging appliance components, etc., will be in a range of 0.033 to 0.023 inches; and (c) thin molded boards or panels and ceiling tile will use beads in a range of 0.023 to 0.016 inches. Upon applying heat to a bead containing foaming agent homogeneously distributed throughout its body, it will be appreciated that the heat penetrates from the outer periferal surface of the bead inward toward the center of the core. The bead formed of organic thermoplastic polymer, most commonly polystyrene, will inherently have low heat conductivity properties. The initial heating of the beads in contact with the heating gas surrounding the bead, such as steam, softens and initiates expansion of the bead from the outer bead surface progressively inward. The vaporization of the low volatile expanding agent may vary somewhat with the actual volatility of the specific expanding agent which is used. The expanding agent per se as it volatilizes to a gas will form a foam progressively as the heat penetrates inward toward the core of the bead, that rate of heat penetration being slowed progressively because the foamed portion of the bead is a heat insulator and the foamy shell formed about the bead resists further heat penetration and foaming. A consequence is that there may be a substantial time lag following exposure of the bead to the heating gas until the heat fully penetrates to the core, that time progressively increasing with the depth or thickness of the foamed shell forming upon the bead.

Figure 1:
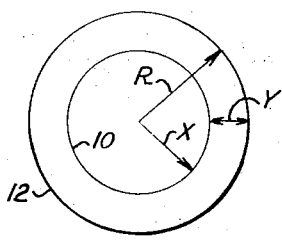
FIG. 1 shows diagrammatically concentric circles intended to illustrate the expansion conditions occurring by heating a bead containing heat expanding agent.

FIG. 1 illustrates this condition as the concentric circles 10 and 12, the total radius R of the bead being a summation of the radical core diameter X and the radial foamable distance Y, respectively. Assuming 50% of the volume of the bead expands inward from its outer shell and, mathematically converting the X and Y radii to the corresponding volumes of the concentric spheres 12 and 10, the outermost to form the corresponding foamed shell, and the innermost the core to which the heat does not penetrate, the following equations govern the computation:

$$X + Y = R$$
$$(4/3) \cdot \pi \cdot R^3 = 2 \cdot (4/3) \pi X^3$$
$$2 X^3 = R^3$$
$$X \; 0.795 \; R$$
$$Y = 0.205 \; R$$

It will be seen, therefore, that the outer shell radius portion Y before expansion is between about one-quarter and one-fifth that of the inner shell radius X. Practically this means that if the bead, a sphere of Radius R, has one-half of its volume heated rapidly, only sufficient to expand and form an outer foamed shell thereon, it would require heat penetration of only about one-quarter to one-fifth of the total radius of the bead to effect this.

It is the practice in the continuous bead molding art to impregnate the bead with about 6% of volatilizable foaming agent, so that when the bead is heated for a sufficient time to allow the heat to penetrate to the core of the bead for the expansion wanted, approximately 6% is all of the expanding agent that would be needed for this. After pre-foaming such bead, as commonly practiced in the molding art, the foaming agent in the shell portion will partly vaporize during the storage time before molding of the pre-expanded beads and about 3% of the foaming agent might be the approximate portion that remains. Moreover, as indicated, the expanded shell portion operates as a heat insulating layer and thus slows the heat penetration into the unexpanded core, so that all of the volatile expanding agent is driven out of the core by the slow heating. Consequently, in the molding of a pre-expanded bead, according to the present practice in the art, the bead is not only partly denuded of expanding agent in the foamed shell portion, but the heat penetration is so slowed by the foamed shell portion already formed in the pre-expansion that continuous present-day molding of such pre-expanded bead is necessarily a very slow molding operation.

Where, however, according to the present invention, the quantity of foaming agent is increased using from 5 to 8 ½% overall bead content of foaming agent, a quantity well beyond that which would vaporize from an outer shell portion by normal pre-expansion, that outer shell portion would still contain a substantial amount of a foaming agent despite pre-expansion and would be capable of providing further expansion in the mold to fill the interstices between particles by the expanded foaming outer portion of the bead. Again, this would require a small radius of heat penetration from the surface inward of the bead. For instance, assuming again one-half of the bead to be expanded and the volatile expanding agent in the outer half has been raised from 3% to 4%, it will be apparent that a faster time relationship for the molding of the beads due to the increased volatility content is greater by the difference in reduced radius of the expanded portion and the following equations illustrate this:

$$X + Y = R$$
$$(4/3) \pi (R^3 - X^3) = 0.75 \; 4/3 \; \pi R^3$$
$$\tfrac{1}{4} R^3 = X^3$$
$$X = 0.63 \; R$$
$$Y = 0.37 \; R$$

The following table illustrates the increased molding rate possible due to the increase in expandable component in the outer shell portion.

TABLE I

| Wt. % Based on Raw Beads | Min. Volatile % Needed (enough for batch molding) | Additional volatile of 1% |
| --- | --- | --- |
| % volatile | 6% | 7% |
| % volatile left after pre-expansion | 3% | 4% |
| Volume of the beads to be supplied with sufficient heat for full expansion | 100% | 75% |
| Depth in the beads to be penetrated with heat | 100% | 37% |

This means that in a case like this almost three times higher molding speed can be kept in the continuous machine due to the one per cent higher volatile content. Practically this means that the expanded surface portions of the beads are caused to expand even further with rapidly applied heat to the pre-foamed beads having a residual content of expanding agent remaining in the surface portion sufficient to fill some 45% of voids existing between the pre-expanded beads as they are supplied to the mold.

It is the surface portions which are expanded to fill the voids rapidly because deep heat transfer into the core of the bead is no longer necessary to achieve the extra expansion needed to fill these voids as in the prior art practice. Consequently, in this first aspect of this invention the bead is initially treated with a volatilizable component to impregnate the beads with a quantity of foaming agent, greatly exceeding that needed to expand the bead to 100% of its capability, i.e., at least 7 ½% and usually preferably at least 8% of volatile content, and the process will work well with 8 ½% or 9% of volatilizable expanding agent, based on the weight of the bead. Such beads impregnated with the substantial excess of expanding agent to allow more than 100% expansion may be pre-expanded, whereby at least 1% of the residual excess of foaming agent will still remain in the bead, a substantial portion of which is capable of further expanding the bead when heated again and which will remain in the pre-expanded foamed shell portion.

FIG. 3 illustrates graphically the foaming agent distribution pattern within a bead subjected to heat distribution of the foaming agent. As shown in this figure the concentration of the foaming agent in the bead is plotted against the distance measured from the center of the bead.

Obviously close in at the core, where the heat of expansion has not penetrated the pre-foamed bead, the concentration of the foaming agent is at a maximum. If a usual 6% of foaming agent has been supplied to the bead, most of it will remain highly concentrated at the core; and the bead will be substantially denuded of foaming agent after pre-expansion at the outer perifery. Hence, for the O diameter at the core, the concentration is greatest, well exceeding that of other portions. As the distance is measured outward, that is, in the periferal surface, the concentration of the expanding agent may be very low, perhaps a fraction of a per cent, substantially nil; whereby the bead could not expand any more because it has no expanding agent at the periferal foamed shell, the initial content of expanding agent at that point having been lost in the pre-expansion. On the other hand, where a large excess of expanding agent is initially present, according to the present invention, the bead will contain a residual quantity of some, perhaps between 0.5 and 2% of expanding agent remaining in the periferal portions. That residual quantity of expanding agent is capable of further expansion, expanding rapidly on contact, and softening with the heating medium to fill the interstices between the beads in the mold. That further expansion, it will be appreciated, is due to the presence of the excess of expanding agent contained.

Figure 7:
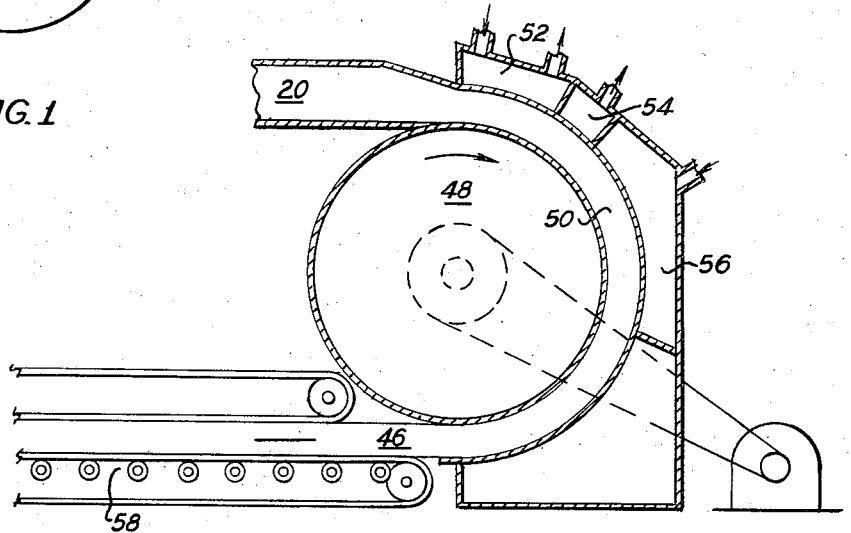
FIG. 7 shows a preferred drum-type molding channel allowing a maximum molding speed for such bead.

That pre-expanded bead may be supplied to a continuous molding machine such as a double belt machine as shown diagrammatically in FIG. 6 and in preferably a rotating drum-type machine as shown diagrammatically in FIG. 7, and in further detail in U.S. Pat. to Berner, No. 3,427,372, the drum-type of machine of the latter patent because it may operate more ruggedly and mold far more rapidly than the belt machine being preferred. The rate of molding will be increased at least three-fold and usually more, at least to a board rate of 50 feet per minute and practically up to 150 feet per minute, having thereby a very greatly increased molding rate with respect to present-day continuous molding of foamed thermoplastic polymer particles.

According to the second aspect of this invention, normally formable beads shortly after heat expansion to pre-foam them and preferably before cooling, are impregnated with additional liquified expanding agent such as by spraying with a gaseous suspension of liquid particles of the foaming agent, sufficient to allow the pre-foamed beads to reabsorb a significant quantity of foaming agent into the outer expanded shell portions thereof and be substantially cooled thereby. Such treatment allows absorption of additional foaming agent into the expanded periferal portions of the pre-foamed beads and become cooled. The additional foaming agent will remain relatively trapped in the localized outer periferal area of the beads in what will amount to a high foaming agent concentration for the localized outer bead portion. For instance, even if as little as one-tenth of one per cent based on the weight of the bead is supplied as extra impregnant or coating upon the outer bead surface, that portion will be taken up by the porous bead surface but will remain concentrated locally for a period sufficient to serve as additional expanding agent for the outer bead portion, just as if much larger quantities up to 5% or 6% of the total weight of the bead had been evenly supplied for impregnating the entire bead with additional foaming agent. Consequently, while additional foaming agent may be supplied in the range of 0.1 up to about 5% by weight of the bead, since it concentrated in the outer bead portion the quantity is not critical.

Figure 2:
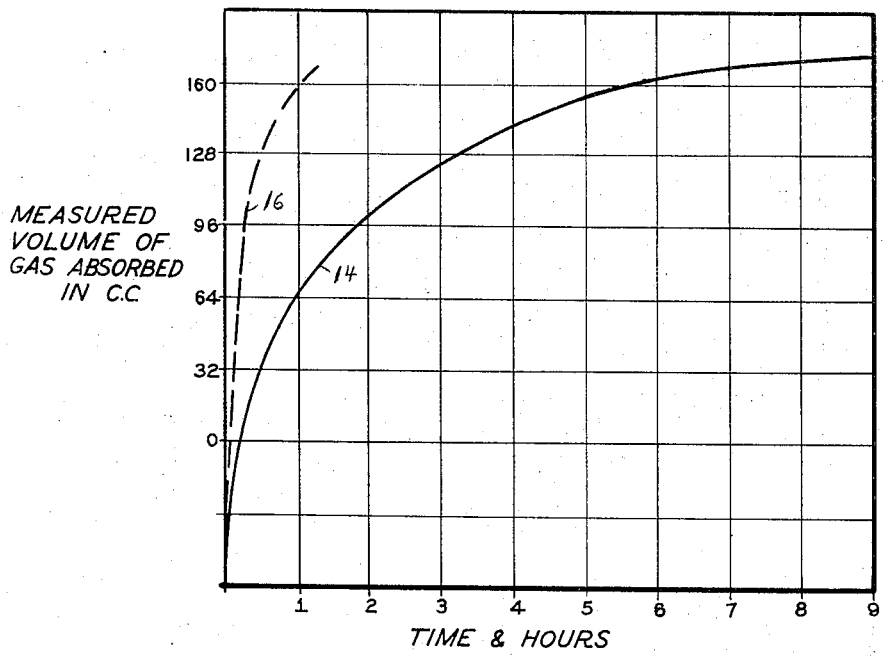
FIG. 2 is a graph showing the rate of absorption of substances back into an expanded bead as it is cooled.

The advantage of this treatment is illustrated in part in FIG. 2 which sets forth graphically the effect of a pre-expanded bead following expansion to reabsorb air or other gas to fill the porous voids formed in the initial pre-expansion of the bead with heat. In FIG. 2 the quantity of air reabsorbed in the pre-expanded bead is plotted against the time following expansion in which the bead exposed to air could reabsorb air to fill the pores. In practice the quantity of air absorbed in the pores is measured in terms of its atmospheric pressure within the bead. The curves 14 of this figure shows that while the pores are about 60% filled with absorbed air in terms of the measured pressure within the bead in about an hour, the bead stored in air does not quite achieve a full normal atmospheric pressure within the voids, even over a period of 9 hours.

The following Table further illustrates the volume and pressure condition of the absorbed air within the bead, following pre-expansion:

TABLE II

FIGURES OBTAINED WHEN EXPOSED TO AIR

| Time Hours | Measured Volume | Total Volume | Derived Pressure |
| --- | --- | --- | --- |
| 0.0 | —c.c. | 19 c.c. | 0.1P |
| 0.5 | 38 | 57 | 0.28 |
| 1.0 | 68 | 87 | 0.44 |
| 1.5 | 84 | 103 | 0.53 |
| 2.0 | 100 | 119 | 0.61 |
| 2.5 | 112 | 131 | 0.67 |
| 3.0 | 123 | 142 | 0.73 |
| 3.5 | 132 | 151 | 0.77 |
| 4.0 | 141 | 160 | 0.82 |
| 4.5 | 148 | 167 | 0.86 |
| 5.0 | 153 | 172 | 0.88 |
| 5.5 | 157 | 176 | 0.90 |
| 6.0 | 161 | 180 | —.92 |
| 6.5 | 164 | 183 | 0.94 |
| 7.0 | 167 | 186 | 0.95 |
| 7.5 | 170 | 189 | 0.97 |
| 8.0 | 173 | 192 | 0.98 |
| 24.0 | Measured Pressure Was | | 0.993 |

In contrast to this, and referring to the curve 16 of FIG. 2, the hot, pre-expanded bead immediately after expanding is subjected to a gaseous spray containing a vaproizable liquid which, on evaporation, cools the outer bead surface, fills the pores with its own vapors, and the vapors diffuse into the beads which very quickly achieve a normal internal pressure in about two hours.

These curves illustrate the fact that the ordinary pre-expanded bead is substantially capable of further expansion where it was cooled in air beyond only a slight amount of heat expansion of the adsorbed air. Such bead filled with air in its pores and being only partly expanded requires substantial additional heating time needed to completely penetrate the core of the bead during molding in order to allow the core to supply the expansion sufficient to fill the spaces between the tangential interstices between the beads as they are stacked in the mold. In other words, the curve demonstrates that the prior art practice of molding an ordinary pre-expanded bead was necessarily relatively slow and that the quenching of the bead after pre-expansion with more liquid foaming agent will inherently and rapidly supply a further expanding capability to the bead which will speed up the molding process. The spraying of such pre-expanded beads may be with any volatilizable foaming agent liquid as listed above.

To illustrate the molding process, reference is made to FIG. 4 which illustrates graphically, in contrast to FIG. 3, the effect of adding an excessive quantity of the volatilize expanding agent. Whereas in the second aspect of the invention the volatilizable expanding agent is added by spraying, the distribution of expanding agent is in the perifery where it appears as an excess. This will be somewhat similar but of a smaller quantity according to the first aspect of the invention where only an overall, evenly distributed excess of expanding agent was initially used. It will be apparent for both aspects that there is sufficient expanding agent removed from the periferal bead portions to provide an extra expansion from the periferal portion of the bead, whether or not the bead is already pre-expanded from a preliminary heating. In the molding of such bead the heat penetration needs to be no deeper than the outer periferal portion which can and will soften and expand much further, filling the voids remaining between tangential contact points of the beads as they are introduced into the mold from the expanding outer portion of the bead. That surface expansion allows a far shorter heating time and a necessarily more shallow heat penetration to effect adequate molding by further expansion and cohesion of the foamed beads within the mold. Advantage of this may be taken in any type of continuous molding by improving the molding speed.

FIG. 6 shows diagrammatically the same type of molding shown in greater detail in the Norrhede et al patent. The pre-expanded beads containing sufficient additional foaming agent in the foamed shell are admitted to a longitudinal molding channel 18 impelled by a feed device 20 to fill the molding space. Such channel 18 is formed between the surfaces of perforated parallel moving belts 22 and 24, each entrained around guide rollers 26 at the forward end, and 28 at the after end of the molding channel. The expandable beads arranged tangentially enter a heating zone 30 having an upper chamber 32 connected to a source of hot gas 33 such as steam and is passed downward therefrom through the perforated upper belt 22 into the loose expandable beads and a lower heating chamber 34 connected to a source of hot heating gas 35, passed upward into the moldable beads both to evenly heat and expand the beads, whereby they soften, cohere and expand from their surfaces to fill the voids evenly in the channel 18 as they pass therealong.

The molded foamed board body passes thence into a cooling zone 36 whereby it can be cooled by the application of a vacuum applied through 38 and lower 40 ducts leading to a vacuum pump [not shown]and may then be further cooled in air passing upward from a lower chamber 42, and downward from an upper chamber 44, into and around the molded board to cool it as it passes outward of the molding device as a finished product molded board 46. The chamber 42 is separated from the vacuum cooling area by partitioning walls 39.

Where such longitudinal molding device was in common prior art use, according to the Norrhede, et al., patent, it was capable of only slow movement considering the time needed for heating to supply sufficient expansion to seal the voids between particles. Practically such machine could be normally operated at 10 to 15 feet per minute and for greater speed, and often with sacrifice of quality of the product having poor cohesion, the longitudinal machine could be pushed to about 20 linear feet per minute, variable somewhat with the dimensions of the machine and operated on ordinary pre-foamed beads initially containing at 6% quantity of foaming agent before pre-expansion. However, that same machine may now be accelerated, operating on a bead with an excessive quantity of foaming agent, according to the first aspect of this invention, or in which the pre-expanded bead has additional foaming agent added, according to the second aspect, the increased speed limit of such machine being now dictated only by its mechanical characteristics to operate a pair of belts practically at such higher speed. The limiting speed of the machine is about 150 feet per minute because of the inherent mechanical weaknesses of such machine; but, nevertheless, the increased speed represents a very great improvement in formed board production with such machine.

A preferred form of continuous molding machine because it can be operated more rapidly is the drum type of machine shown in the Berner U.S. Pat. No. 3,427,372, of which FIG. 7 is a diagrammatic reproduction. As there shown, the beads can be fed by a similar helical screw feeder 20 into an arcuate molding channel formed between the rotating surface of a rotating drum 48 and a stationary plate 50. Either or both the plate and drum surfaces in contact with the molding channel may be perforated to allow passage of heating and cooling media into the molded product therein, as well as intermediate cooling by vacuum, when desired. Arranged around the stationary plate are zones 52, 54, 56 and 58 which progessively control the temperature and passage of heating and cooling medium including application of a vacuum as desired in rapid cooling of the molded product as it passes arcuately through the molding channel and is emitted as finished board 46 upon a conveyor belt 58. With the arcuate type of molding, it is easier to accomplish greater speeds in expanding molding the beads treated by the present method because, mechanically, the drum and plate may be operated more rapidly to effect a molding of a board of this character with a speed limit greatly exceeding that of the longitudinal molding. Using the drum-type of machine, molding practically up to six hundred feet per minute is possible.

It has been proposed in the art to effect a pre-expansion of expandable beads having a similar type of foaming agent therein by heating the bead while applying a vacuum thereto. The heating in the presence of a vacuum slowly above the softening point allows great expansion of the beads.

According to a third aspect of this invention, these loose beads heated in a vacuum and more greatly expanded thereby, instead of quenching in cool air, are now, according to this invention, quenched with a spray of foaming agent. The net effect is to cool the bead as a pre-foamed bead, non-cohered; that is, beads that are free flowing as loose popcorn, but which are much more highly expanded and which contain by the quenching in a liquid spray of more liquified foaming agent, a concentration of more foaming agent in the outer periferal portions of said beads. Thus, while the vacuum expanded pre-foamed beads have normally a larger foamed volume, such pre-foamed bead may now be again foamed and by a multi-foaming be even further expanded. The beads thus very highly expanded by multiple foaming may be used as a very light, new, foamed product of extremely widely expanded bead, now expanded at least twice the volume of a normal pre-foamed bead because of the second and perhaps third or even forth expansion. However, such vacuum pre-expanded bead in which additional foaming agent is supplied to the periferal surface, and which is then further expanded while molding in a continuous molding channel, may be molded into a foamed board of similar molded product at the said extremely high speeds, limited only by the high speed capacity of the continuous molding machine.

For such multi-foamable bead production, reference is made to FIG. 5 which shows a vacuum chamber 60 which is partially filled with foamable beads containing a normal 5% to 6% content of foaming agent. The chamber 60 is connected by way of line 62 to a vacuum pump [not shown] whereby the internal pressure may be reduced to below about 100 mmHg. The vessel 60 is jacketed for heating such as by passing steam around the vessel and is slowly heated to the softening point, whereby the beads expand to many times their initial volume such as twenty to thirty times their initial volume. Thereafter the warm, vacuum-expanded beads are cooled in a spray of more foaming agent carried by gaseous vapors of the spraying agent of the type described, the liquid foaming agent thus being sprayed by a gas phase passing into the chamber. The spray coating upon the expanded beads simultaneously wets and cools them, whereby the beads by release of the vacuum and returning to atmospheric pressure take up a surface concentration of foaming agent. The treated beads with the applied additional foaming agent are withdrawn from the chamber 60 through an outlet 66 and may be stored as such or passed immediately to a continuous molding device as shown in FIGS. 6 and 7 for rapid conversion into molded board. Alternately, the beads may be again heated and if desured under vacuum, in the same chamber 60 until they are soft enough for further expansion followed by another cycle of cooling even with further spraying with more foaming agent.

As thus described in the several aspects of this invention, beads having a sufficient content of expanding agent in the outer expanded shell after pre-expansion are again molded after further expansion, said molding being possible at high speed. The unexpanded bead must originally have contained such excess, usually 7 ½ to 9%, based on the weight of the bead, to allow following pre-expansion, a residual quantity of expanding agent to remain in the outer expanded periferal portions of the bead to allow further expansion during high speed molding. Such pre-expanded bead while it may contain on the average of about 4% of expanding agent throughout, most of which is concentrated in the core, the expanded portion per se will generally contain less than 4%, which is sufficient to provide the extra expansion. It is preferred, shortly following pre-expansion, to impregnate the outer porous shell of the pre-expanded bead with additional expanding agent such as spraying the beads with more volatilizable liquid expanding agent. It is preferred, further, to pre-expand the bead in a vacuum whereby greater expansion results and then, shortly following the expansion, and while the bead is warm, to cool it with a spray of liquid foaming agent whereby in each case the foaming agent concentrates in the outer porous shell of the bead, providing thereby an additional expanding capacity upon subsequent heating. Such spray is most usefully applied while the vacuum expanded bead is being returned to normal atmospheric pressure. For even greater expansions the vacuum expanded bead sprayed with more foaming agent may be expanded more than once, each time spraying with more foaming liquid, according to this process for greatly expanded bodies.

Thus a bead containing expanding agent may usually expand up to 30 times its initial volume of the small hard beads in the pre-expansion. Where an excess of foaming agent has been added, the bead will expand to some 60 to 65 times the initial volume and this expansion will largely come from the outer perifery of the already expanded portion of the bead, filling the interstices between the beads as they expand, which normally amount to some 45% of the volume of pre-expanded beads stacked in tangential contact in the mold. The interstices, as stated, are filled by expansions of the periferal portions up to 90% or more of all the space between beads in the mold and this is effected in said rapid molding.

In normal molding of a foamed bead it is usual to add various quantities even up to as much as 15% of ground scrap, i.e., foamed molded board remaining from previously foamed products. That scrap without further treatment has little further expandability and not more than about 15% of such scrap could be incorporated in multi-foamable rapid molding beads having extra expanding agent, as described according to this invention. However, the scrap material per se may be treated after crushing to bead size with extra expanding agent to provide an overall content of at least 4% of expanding agent throughout the crushed scrap, preferably by heating under vacuum and spraying the warmed scrap particles with more foaming agent as described above. In that manner up to 75% of scrap or even more may be mixed with the newly formed beads, and the mix may then be used as a high speed molding material.

The following examples illustrate the practice of this invention:

EXAMPLE 1

Polystyrene beads of mixed particle size as formed by suspension polymerization in the range of 40 to 30 U.S. standard sieve are treated to impart foaming properties by impregnating the beads by immersion in liquid n-pentane until a total quantity of 8% by weight of the bead is imparted. The beads are then preliminarily expanded by heating with the steam. The pre-expanded beads are found to contain 4 ½% residual expanding agent of which 1 ½% is contained in the outer expanded shell portion. These beads are then sprayed with a light mineral oil to impart 0.25% mineral oil coating and finally molded in a longitudinal type of molding machine as described in the above-cited Norrhede, et al., patent, but operated at a linear speed of 60 feet per minute, forming a board having a thickness of 1 inch. For that kind of rapid molding the machine was modified as shown in FIG. 6 to impart a vacuum for preliminarily cooling at a stage intermediate the cooling chamber and the heating chamber. The board produced at this speed was of high quality and produced at a rate about four times of the normal operational speed of a longitudinal molding machine as taught by Norrhede, et al.

The board after molding still has a residual content of about 2% of foaming agent, after being foamed, which was partially trapped in the pores of the foam. However, that forming agent content on weathering for a period of two weeks, was reduced to less than about one-half per cent.

EXAMPLE 2

The beads as described in Example 1 having a particle size averaging in the range of about 30 to 20 U.S. standard sieve, and pre-treated with foaming agent to impart a 6% content of foaming agent consisting of n-pentane, were pre-foamed with steam passed through the jacket of a vessel to soften the beads, thereby expanding the beads to about thirty volumes. The loose, hot, pre-foamed beads are then cooled in a spray of liquid n-pentane carried in n-butane gas as a carrier, imparting to the pre-foamed beads a total quantity of foaming agent of 5%, of which 2% was relatively concentrated in the outer expanded periferal shell of the beads, such periferal shell after pre-expansion, and before addition of more foaming agent, containing less than 0.1 of foaming agent, even though the bead overall, following pre-foaming, still contained concentrated in the core a total quantity of about 3% of foaming agent. The treated beads were then similarly molded in a Norrhede, et al., type of longitudinal type molding device into one inch boards operated at a rate of one hundred feet per minute, and board of similar good quality was obtained as disclosed in Example 1.

EXAMPLE 3

The same beads as those formed in Example 2 were molded in a drum-type machine, as described in the Berner patent, forming 1 inch thick board at 300 feet per minute; and similar good quality board was formed.

EXAMPLE 4

Polystyrene beads having a particle size mixture in the range of 20 to 16 mesh, U.S. standard sieve, were slowly heated in a vacuum chamber maintained at a reduced pressure of 10 mmHg, the beads initially containing 6% of n-pentane as expanding agent, whereby the beads increased 35 times in volume from the initial size. Thereafter heating was discontinued and the contents of the chamber were quenched by admitting a gas consisting of n-butane into which was introduced liquid n-pentane being applied as a spray upon the hot expanded beads which were simultaneously agitated to apply an even liquid coating thereover and to supply an additional 2% of expanding agent whereby the total expanding agent content of the beads was about 5%, the beads being simultaneously cooled by the spray. Thereafter the beads were rapidly molded in a rotary drum-type of molding device as shown in the Berner patent, according to Example 3, thus forming the molded board about 1 inch thick at a molding speed of 300 feet per minute. The expanded particles in the mold achieved an approximate diameter of some 60 times the initial volume of the bead and were well cohered throughout the center of the board in a relatively even matrix.

EXAMPLE 5

The pre-foamed beads after impregnating with a spray of n-pentane in n-butane as a carrier gas, as described in Example 4, are then again expanded by heating slowly above the softening point to achieve an expanded volume of about 60 times the original volume of the bead and is then cooled to form loose, highly-expanded beads, useful as such as a filler material for packaging. These multi-foamed beads may be cooled in a second spray of foaming agent and then molded as in Example 4.

As thus described a pre-foamed bead having sufficient foaming agent in the pre-expanded periferal portion to further expand when continuously molded in the presence of a heated gas to rapidly fill the interstices between the pre-foamed particles allows rapid, continuous molding. The foaming agent present in the periferal portion of the pre-expanded bead may be a residual quantity from initial treatment of the bead with an excess of foaming agent or such periferal forming agent may be present by addition of more foaming agent to the pre-foamed bead. the data given above for additional foaming agent is for a fully polymerized bead. Somewhat lesser quantities of additional foaming agent may be supplied where the bead has not been fully polymerized and may contain a residual, small quantity of unpolymerized monomer from which the bead was initially formed, such monomer tending also to volatilize and expand with heat and act per se as a foaming agent. Consequently, where the quantities of additional foaming agent are stated, these may be considered as a composite of the added foaming agent and residual polymerizable monomer which may have been present in an incompletely polymerized bead.

The bead, as stated, may be expanded in a multiple of expansions, as described. The highly expanded produce is useful not only in high speed molding but for some other uses such as a foamed spongy filler material in a variety of uses for such product, such as in packaging in which such highly foamed product need not have been molded.

Certain modifications as known in the molding art will occur to those skilled in the art and may be included here. Accordingly, it is intended that the illustrations and examples given be regarded as illustrative and not limiting except as defined in the claims appended hereto.

What is claimed is:

1. The process of rapidly molding articles from foamable beads comprising pre-expanding foamable beads containing an excess of a volatizable liquid foaming agent with heat under conditions to form pre-expanded beads containing at least sufficient, residual quantity of foaming agent about 0.05 to 2% in the expanded periferal portions of said beads to allow rapid heat transfer and effect further expansion of said pre-expanded beads with heat, contacting said pre-expanded beads with a hot gaseous heating medium for a short period sufficient to contact the outer periferal expanded portions of said pre-expanded beads and to continue expansion thereof by activating the residual forming agent in the expanded portion of said bead, said heat supplied by said medium being sufficient to soften the surface portions of said beads enough to cause the expanded bead surfaces to cohere, and molding said beads continuously in a molding channel in which the moldable mass of heated beads is moved at a rate exceeding about 50 feet per minute 2. The process as defined in claim 1 wherein the residual foaming agent in the expanded portion of said beads is supplied by impregnating the bead before heating with such excess of foaming agent as will allow a residual overall content of at least 4% of foaming agent to remain distributed throughout the beads including the periferal portions after pre-expansion.

3. The process of rapidly molding foamable beads into an agglomerate foamed product comprising pre-expanded foamable beads, impregnating the pre-foamed beads with an extra portion of liquid foaming agent applied to the outer expanded surface portions of said beads to effect further expansion of said pre-expanded beads with heat, contacting said pre-expanded beads with a hot gaseous heating medium for a short period sufficient to contact the outer periferal expanded portions of said pre-expanded beads and to continue expansion thereof by activating the residual foaming agent in the expanded portion of said beads said heat supplied by said medium being sufficient to soften the surface portions of said beads enough to cause the expanded bead surface to cohere, and molding said beads continuously in a molding channel in which the moldable mass of heated beads is moved at a rate exceeding about 50 feet per minute.

4. The process as defined in claim 3 wherein the liquid foaming agent is supplied by spraying said liquid foaming agent upon the outer surface portions of said pre-foamed beads.

5. The process as defined in claim 3 wherein the residual foaming agent in the expanded portion of said beads is supplied by prefoaming the beads under reduced pressure and spraying the hot pre-foamed beads with a liquid foaming agent to cool the beads while returning to atmospheric pressure.

6. The process as defined in claim 5 wherein the cooled beads containing the additional quantity of foaming agent supplied by spraying are again heated slowly under reduced pressure to further expand said beads by expansion of the periferally added portions of expanding agent, and are again cooled and returned to atmospheric pressure while spraying with a second portion of liquid expanding agent.

7. The process of highly expanding foamable beads containing a foaming agent comprising pre-expanding the foamable beads by slowly heating to allow said beads to expand and then cooling said beads by spraying with a volatilizable liquid foaming agent and then further expanding the beads by slowly heating the beads to soften and allow the foamed beads to further expand.

8. The process as defined in claim 7 wherein the beads are simultaneously molded while the final expansion is taking place, the expansion temperature being sufficient to soften the beads to allow them to cohere one to the next in the highly expanded form.

9. The process as defined in claim 7 wherein following the last expansion of the beads with heat, the expanded beads are again quenched and returned to normal pressure by spraying the wet beads with more expanding agent, whereby the beads are capable of still further expansion with heat.

10. The process as defined in claim 7 wherein the heating of the beads is effected, at least in the first stage expansion, at reduced pressure.

11. The process as defined in claim 10 wherein the beads are simultaneously molded while the final expansion is taking place, the expansion temperature being sufficient to soften the beads to allow them to cohere one to the next in the highly expanded form.

12. The process as defined in claim 10 wherein following the last expansion of the beads with heat, the expanded beads are again quenched and returned to normal pressure by spraying the hot beads with more expanding agent, whereby the beads are capable of still further expansion with heat.

13. The process as defined in claim 1 wherein the beads are continuously molded into a foamed molded product in a longitudinal molding machine operated at a rate exceeding 50 linear feet per minute.

14. The process as defined in claim 1 wherein the beads are continuously molded into a foamed molded product in an arcuate drum and plate type of molding machine operated at a rate in the range of 50 to 600 linear feet per minute.

15. The process as defined in claim 1 wherein the foamable beads before molding consist largely of foamed scrap formed by grinding a foamed molded product formed in an earlier molding, said scrap being impregnated with sufficient additional foaming agent to impart to the outer periferal portions thereof a substantially similar content of expanding agent as the pre-foamed beads with which it is mixed.

16. The process as defined in claim 15 wherein the additional foaming agent is added to the said scrap by spraying a liquid foaming agent upon the particle surfaces of the ground scrap material before mixing with said foamable particles.

* * * * *

UNITED STATES PATENT OFFICE
CERTIFICATE OF CORRECTION

Patent No. 3,853,972          Dated December 10, 1974

Inventor(s) Erling Berner

It is certified that error appears in the above-identified patent and that said Letters Patent are hereby corrected as shown below:

Column 15, line 1, "forming" should read -- foaming --.

Column 15, line 27, after "beads" insert a -- , --.

Signed and sealed this 18th day of February 1975.

(SEAL)
Attest:

RUTH C. MASON
Attesting Officer

C. MARSHALL DANN
Commissioner of Patents
and Trademarks